United States Patent
Chen et al.

(10) Patent No.: US 8,953,748 B2
(45) Date of Patent: Feb. 10, 2015

(54) METHOD AND APPARATUS FOR MONITORING POWER CONSUMPTION VALUE OF DSL SUBSCRIBER BOARD

(75) Inventors: Liang Chen, Shenzhen (CN); Hao Zhang, Shenzhen (CN); Hui Sheng, Shenzhen (CN); Li Wang, Shenzhen (CN); Jun Zhou, Shenzhen (CN); Dong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 441 days.

(21) Appl. No.: 13/463,389

(22) Filed: May 3, 2012

(65) Prior Publication Data

US 2012/0219124 A1   Aug. 30, 2012

Related U.S. Application Data

(63) Continuation of application No. PCT/CN2010/077785, filed on Oct. 15, 2010.

(30) Foreign Application Priority Data

Nov. 3, 2009  (CN) .......................... 2009 1 0210608

(51) Int. Cl.
*H04M 3/22* (2006.01)
*H04L 12/12* (2006.01)
(Continued)

(52) U.S. Cl.
CPC ............ *H04L 12/12* (2013.01); *H04L 12/2898* (2013.01); *H04L 43/08* (2013.01); *H04M 3/2209* (2013.01); *H04M 11/062* (2013.01);
(Continued)

(58) Field of Classification Search
USPC ........ 379/32.04, 26.01, 93.36, 169, 322, 323, 379/395.01
See application file for complete search history.

(56) References Cited

U.S. PATENT DOCUMENTS 6,351,509 B1 * 2/2002 Vitenberg et al. ............. 375/377
2008/0224892 A1   9/2008 Bogolea et al.
(Continued)

FOREIGN PATENT DOCUMENTS

CN   1625130 A   6/2005
CN   101001171 A   7/2007
(Continued)

OTHER PUBLICATIONS

Translation of the International Search Report mailed in PCT Application No. PCT/CN2010/077785 originally mailed Jan. 20, 2011.
(Continued)

*Primary Examiner* — Yosef K Laekemariam
(74) *Attorney, Agent, or Firm* — Leydig, Voit & Mayer, Ltd

(57) ABSTRACT

A method and an apparatus for monitoring a power consumption value of a DSL subscriber board in real time are provided. The method includes: monitoring a working state of each subscriber port on the DSL subscriber board, the number of subscriber ports in each working state, and an output power of each LD subunit in an LD unit on the DSL subscriber board; and calculating a power consumption value of the DSL subscriber board in real time according to a monitoring result and preset electrical parameters of each functional unit.

17 Claims, 6 Drawing Sheets

(51) Int. Cl.
*H04L 12/28* (2006.01)
*H04L 12/26* (2006.01)
*H04M 11/06* (2006.01)
*H04M 3/00* (2006.01)

(52) U.S. Cl.
CPC ............... *Y02B 60/34* (2013.01); *Y02B 60/36* (2013.01); *H04M 3/007* (2013.01); *H04Q 2213/13003* (2013.01); *H04Q 2213/13039* (2013.01); *H04Q 2213/1308* (2013.01); *H04Q 2213/13092* (2013.01)
USPC .................... 379/32.04; 379/93.36; 379/169; 379/395.01

(56) References Cited

U.S. PATENT DOCUMENTS

2009/0138219 A1  5/2009  Bletsch et al.
2011/0135017 A1  6/2011  Tu

FOREIGN PATENT DOCUMENTS

| CN | 101345552 A | 1/2009 | |
| CN | 201248079 Y | 5/2009 | |
| CN | 101478464 A | 7/2009 | |
| EP | 2073567 | * 12/2007 | ............. H04Q 11/04 |
| EP | 2073567 A1 | 6/2009 | |
| WO | WO 2009122410 A2 | 10/2009 | |

OTHER PUBLICATIONS

International Searching Authority of the People's Republic of China, Written Opinion of the ISA in PCT Application No. PCT/CN2010/077785 (Jan. 20, 2011).
International Search Report in corresponding International Patent Application No. PCT/CN2010/077785 (Jan. 20, 2011).
Written Opinion of the International Searching Authority in corresponding International Patent Application No. PCT/CN2010/077785 (Jan. 20, 2011).
Extended European Search Report in corresponding European Patent Application No. 10827860.7 (Sep. 11, 2012).

* cited by examiner

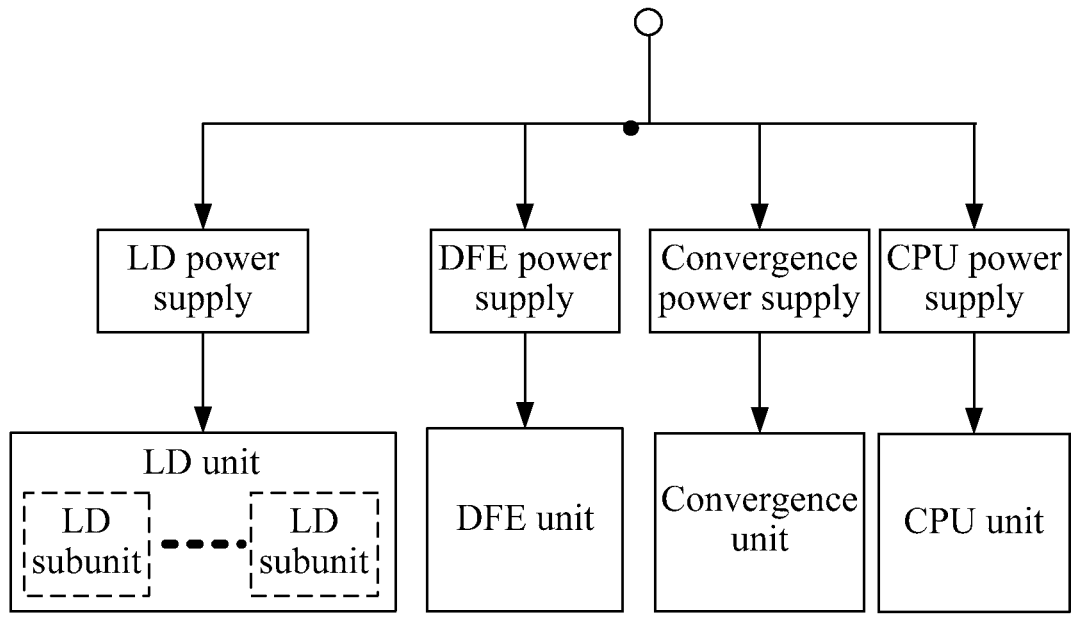

FIG. 1

Monitor a working state of each subscriber port on the DSL subscriber board, the number of subscriber ports in each different working state, and an output power of each LD subunit of an LD unit on the DSL subscriber board ~201

Calculate a power consumption value of the DSL subscriber board in real time according to a result of the monitoring and preset electrical parameters of each functional unit when the port is in different states ~202

FIG. 2

METHOD AND APPARATUS FOR MONITORING POWER CONSUMPTION VALUE OF DSL SUBSCRIBER BOARD

CROSS-REFERENCE TO RELATED APPLICATION

This application is a continuation of International Application No. PCT/CN2010/077785, filed on Oct. 15, 2010, which claims priority to Chinese Patent Application No. 200910210608.6, filed on Nov. 3, 2009, both of which are hereby incorporated by reference in their entireties.

FIELD OF THE DISCLOSURE

The present disclosure relates to broadband access technologies, and in particular, to a method and an apparatus for monitoring a power consumption value of a Digital Subscriber Line (DSL) subscriber board.

BACKGROUND OF THE DISCLOSURE

As a mainstream broadband access technology, the DSL access technology is now serving hundreds of millions of users around the world. With the intensification of the greenhouse effect and energy shortage, the energy consumption of DSL subscriber boards attracts more and more attention of operators.

Currently, a common method for monitoring a power consumption value of a subscriber board is that current and voltage testing instruments/meters are externally connected to the DSL subscriber board directly, and the power consumption of the DSL subscriber board is calculated by multiplying the current by the voltage. However, this method involves external connection of testing instruments/meters and manual operation, and cannot realize remote monitoring or real-time power consumption monitoring for a large number of DSL subscriber boards at the same time.

Another method for estimating power consumption of a DSL subscriber board in real time is that: Hardware monitors input current and voltage values of the subscriber board in real time, and reports the values to a CPU; the CPU executes the formula of multiplying the current by the voltage to estimate the power consumption of the subscriber board and obtain a result of the real-time power consumption estimation.

However, the real-time power consumption monitoring method in the prior art involves increase of hardware cost and modification to the hardware circuit design of the existing DSL subscriber board, and is unable to monitor the power consumption value of each constituent functional unit or the power consumption value of each subscriber port of the DSL subscriber board in real time.

SUMMARY OF THE DISCLOSURE

The objective of the present disclosure is to provide a method and an apparatus for monitoring a power consumption value of a DSL subscriber board, for solving the problem in the prior art that the power consumption of the DSL subscriber board cannot be monitored in real time.

In order to solve the above problem, an embodiment of the present disclosure provides a method for monitoring a power consumption value of a DSL subscriber board, which includes:

monitoring a working state of each subscriber port on the DSL subscriber board, the number of subscriber ports in each working state, and an output power of each LD subunit in an LD unit on the DSL subscriber board; and calculating a power consumption value of the DSL subscriber board in real time according to a monitoring result and preset electrical parameters of each functional unit.

An embodiment of the present disclosure further provides an apparatus for monitoring a power consumption value of a DSL subscriber board, which includes:

a monitoring unit, configured to monitor a working state of each subscriber port on the DSL subscriber board, the number of subscriber ports in each different working state, and an output power of each LD subunit in an LD unit on the DSL subscriber board; and a calculating unit, configured to calculate a power consumption value of the DSL subscriber board in real time according to a result of the monitoring and preset electrical parameters of each functional unit.

An embodiment of the present disclosure further provides an apparatus, which includes a processor configured for implementing a method including: monitoring a working state of each subscriber port on a DSL subscriber board, the number of subscriber ports in each working state, and an output power of each LD subunit in an LD unit on the DSL subscriber board; and calculating a power consumption value of the DSL subscriber board in real time according to a monitoring result and preset electrical parameters of each functional unit.

In the embodiments of the present disclosure, the working state of the subscriber port on the subscriber board, the number of subscriber ports in each different state, and the output power of each LD subunit on the DSL subscriber board are monitored in real time, and preset electrical parameters are used, so as to monitor the total power consumption value of the DSL subscriber board, the power consumption value of each subscriber port, and the power consumption values of the LD unit and a Digital Front End (DFE) unit in real time.

BRIEF DESCRIPTION OF THE DRAWINGS

FIG. 1 is a schematic structural diagram of a DSL subscriber board in an embodiment of the present disclosure;

FIG. 2 is a flowchart of a first specific embodiment of a method for monitoring a power consumption value of a DSL subscriber board in the embodiments of the present disclosure;

DETAILED DESCRIPTION OF THE EMBODIMENTS

Figure 3:
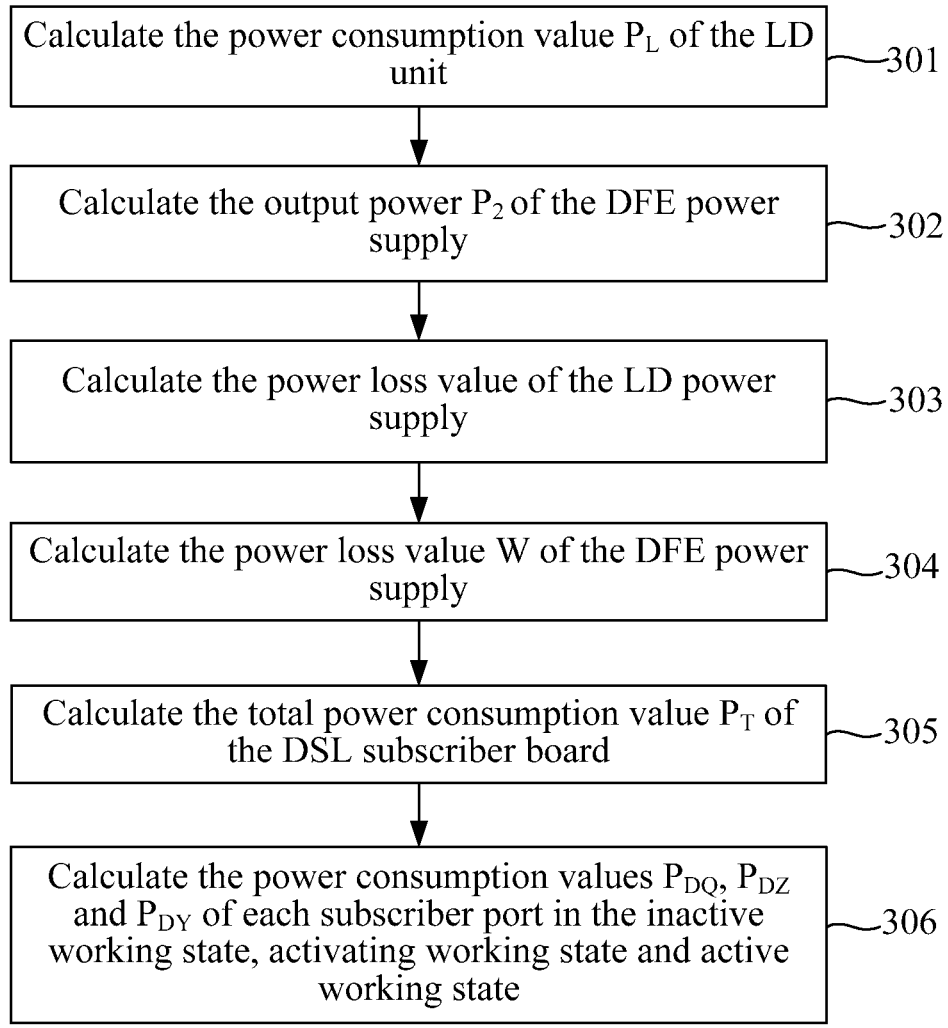
FIG. 3 is a flowchart of a second specific embodiment of a method for monitoring a power consumption value of a DSL subscriber board in the embodiments of the present disclosure.

The technical solutions under the present disclosure are elaborated below with reference to accompanying drawings and embodiments.

FIG. 1 is a schematic structural diagram of a DSL subscriber board in an embodiment of the present disclosure. As shown in FIG. 1, the DSL subscriber board in the embodiment of the present disclosure includes functional units and power supplies. The functional units include a line driver (LD) unit, a digital front end (DFE) unit, a CPU unit, and a convergence unit. The power supplies include: an LD power supply that supplies power to the LD unit, a DFE power supply that supplies power to the DFE unit, a CPU power supply that supplies power to the CPU unit, and a convergence power supply that supplies power to the convergence unit. The power consumption values of the CPU power supply and the convergence power supply are preset constants.

During the use of the DSL subscriber board, a subscriber port on the DSL subscriber board is in one of three working states: inactive, activating, and active. The state that the subscriber port on the DSL subscriber board is not responsive or connected to any user equipment is defined as the inactive state; the state that the subscriber port on the DSL subscriber board is responsive but not connected to any user equipment is defined as the activating state; and the state that the subscriber port on the DSL subscriber board is responsive and connected to a user equipment is defined as the active state.

FIG. 2 is a flowchart of a first specific embodiment of a method for monitoring a power consumption value of a DSL subscriber board in the embodiments of the present disclosure. As shown in FIG. 2, the method for monitoring a power consumption value of a DSL subscriber board in the embodiment of the present disclosure includes the following steps.

Step 201: Monitor a working state of each subscriber port on the DSL subscriber board, the number of subscriber ports in each different working state, and an output power of each LD subunit of an LD unit on the DSL subscriber board.

Specifically, first, whether a subscriber port is in an inactive, activating, or active working state may be detected according to whether the subscriber port on the DSL subscriber board is responsive and connected to a user equipment.

Further, the DFE unit may report the output power of each LD subunit in real time while the DSL subscriber board is used.

Step 202: Calculate a power consumption value of the DSL subscriber board in real time according to a result of the monitoring and preset electrical parameters of each functional unit when the subscriber port is in different working states.

When the subscriber ports of the DSL subscriber board are in different working states, the power consumption values of the convergence unit and the CPU unit do not change and are constants; when the subscriber ports are in the inactive and activating working states, the power consumption value of each LD subunit is a constant; when the subscriber ports are in the active working state, the power consumption value of the LD unit changes with the change of the number of the subscriber ports in the active state because the output power of each LD subunit changes at this time. The output power of each LD subunit may be reported by the DFE unit in real time.

The power consumption value of the DSL subscriber board is also related to the power consumption values of the LD power supply and the DFE power supply. The preset electrical parameters of each functional unit include: power consumption values of the convergence unit and the CPU unit, a static bias current of the LD unit, a change amount of the output power of the LD power supply and the DFE power supply when the subscriber port changes from the inactive state to the activating state and the active state, and a mapping relation between the output current and the power consumption efficiency. The preset electrical parameters may be obtained from product specifications or measured beforehand, or may depend on the inherent characteristics of the hardware, and it is not necessary to connect an external measurement device in real time, change the circuit design of the DSL subscriber board, or add a dedicated measurement unit. The output power and the power loss values of the LD power supply and the DFE power supply may also be looked up in a preset table.

According to the relation between the power supply and the functional unit of the DSL subscriber board, the total power consumption value $P_T$ of the DSL subscriber board is the sum of the output power and the power loss values of the power supplies of the DSL subscriber board. The output power of the LD power supply is the power consumption value of the LD unit, the output power of the DFE power supply is provided to the DFE unit, and the power consumption values of the CPU unit and the convergence unit are constants which are preset electrical parameters. Therefore, after the output power of the DFE power supply is calculated, it is easy to obtain the power consumption value of the DFE unit. The total power consumption value $P_T$ of the DSL subscriber board can be obtained by adding up the power loss values of the LD unit, the DFE unit, the CPU unit and the convergence unit as well as the power supplies.

The method for monitoring the power consumption value of the DSL subscriber board in the embodiment of the present disclosure can also be used to monitor a power consumption value of a subscriber board in various communication networks such as a passive optical network.

In the embodiment of the present disclosure, the working state of the subscriber port on the subscriber board, the number of subscriber ports in each working state, and the output power of the LD unit on the DSL subscriber board are monitored in real time and the preset electrical parameters are used, so as to monitor the total power consumption value of the DSL subscriber board, the power consumption value of each subscriber port, and the power consumption values of the LD unit and the DFE unit in real time. The operator can take effective energy-saving measures according to the power consumption value of the DSL subscriber board or the functional unit on the DSL subscriber board to reduce energy consumption of the DSL subscriber board and realize high-efficiency energy utilization, so as to protect environment and reduce operating cost.

Described below is a second specific embodiment of a method for monitoring a power consumption value of a DSL subscriber board in the embodiments of the present disclosure.

FIG. 3 is a flowchart of a second specific embodiment of a method for monitoring a power consumption value of a DSL subscriber board in the embodiment of the present disclosure. As shown in FIG. 3, the method for monitoring a power consumption value of a DSL subscriber board in the embodiment of the present disclosure includes the following steps.

Step 301: Calculate the power consumption value $P_L$ of the LD unit.

The power consumption value $P_L$ of the LD unit can be calculated according to a corresponding power consumption value $P_{LQ}$ of an LD subunit when a subscriber port is in an inactive state, a corresponding power consumption value $P_{LZ}$ of an LD subunit when a subscriber port is in an activating state; and a power consumption value $P_{LYn}$ of an LD subunit corresponding to each subscriber port in an active state. The calculation formula (1) is:

$$P_L = N_{LQ} * P_{LQ} + N_{LZ} * P_{LZ} + \sum_{n=0}^{Nm} P_{LYn} \quad (1)$$

In the formula above, $N_{LQ}$ represents the number of subscriber ports in the inactive state; $N_{LZ}$ represents the number of subscriber ports in the activating state; n represents the number of subscriber ports in the active state; and Nm is the number of all subscriber ports on the DSL subscriber board.

Specifically, the power consumption value $P_{LQ}$ of the LD unit corresponding to the subscriber port in the inactive state and the power consumption value $P_{LZ}$ of the LD subunit corresponding to the subscriber port when the subscriber port is in the activating state are constants, and can be obtained through lookup in specifications of the LD unit. The power consumption value $P_{LYn}$ of the LD subunit corresponding to the nth subscriber port in the active state may be calculated through formula (2) which is shown as follows:

$$P_{LYn} = (\sqrt{10^{P_{LOn}/10}} * N * 0.8 + I_q) * V_{LS} + P_C \quad (2)$$

$P_{LOn}$ is the output power of the LD subunit corresponding to the nth subscriber port in the active state; Iq is the static bias current of the LD unit; $V_{LS}$ is the voltage provided by the LD power supply to the LD unit; and N is a preset transformation ratio of a transformer between the subscriber port and the LD unit.

$P_{LOn}$ may be reported by the DFE unit; Iq, $V_{LS}$ and N are constants; $P_C$ is a preset difference between the theoretical calculated value and the measured power consumption value of the LD subunit, and is used to perform calibration for the theoretical $P_L$ value and measured $P_L$ value. The output power $P_{LOn}$ of the LD subunit for the nth subscriber port in the active state is a variable, and the specific value thereof is reported by the DFE unit. $P_{LOn}$ ranges from −20 dBm to 20.5 dBm. The power consumption value of $P_{LYn}$ is provided by the LD power supply. Because all the output power of the LD power supply is provided to the LD unit, the output power value of the LD power supply is the power consumption value $P_L$ of the LD unit.

In addition, in practice, the power consumption value corresponding to the LD subunit may also be obtained through lookup in a table. Generally, the power consumption value of the LD subunit corresponding to the output power of the LD subunit is tested beforehand, and a preset table of the power consumption values corresponding to the output power of the LD subunit is created. The output power of the LD subunit uses 0.1 dBm as step length, and ranges from −20 dBm to 20.5 dBm. Afterward, the power consumption value of the LD subunit corresponding to the output power of the LD subunit at this time can be obtained through lookup in the preset table of power consumption values corresponding to the output power according to the output power of the LD unit.

Step 302: Calculate the output power $P_2$ of the DFE power supply.

The output power $P_2$ of the DFE power supply is calculated through formula (3) which is shown as follows:

$$P_2 = (P_{2Q} + N_{2Z} * P_{2Z} + N_{2Y} * P_{2Y}) \quad (3)$$

In the formula above, $P_{2Q}$ is the power output by the corresponding DFE power supply when all user ports are in the inactive state; $P_{2Z}$ is the corresponding increment of the output power of the DFE power supply when a subscriber port changes from the inactive state to the activating state; $N_{2Y}$ is the number of subscriber ports which change from the activating working state to the active working state; $P_{2Y}$ is the corresponding increment of the output power of the DFE power supply when a subscriber port changes from the activating state to the active state; and $N_{2Z}$ is the number of subscriber ports which change from the inactive state to the activating state.

Step 303: Calculate the power loss value of the LD power supply.

Figure 4:
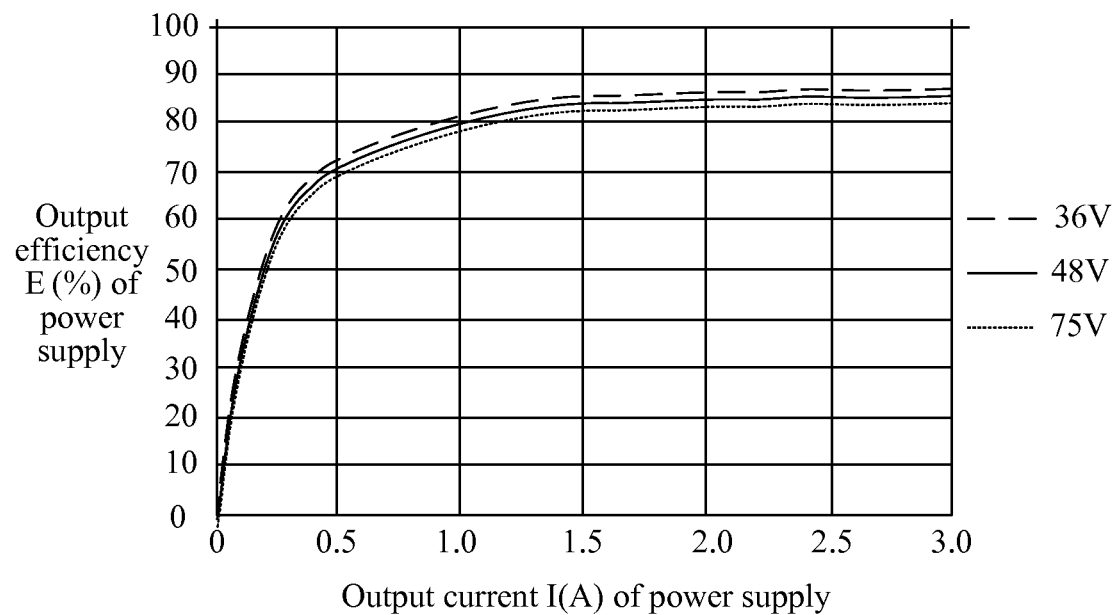
FIG. 4 is a schematic diagram illustrating the relation between an output power efficiency $E_1$ and an output current $I_1$ of a power supply.

FIG. 4 is a schematic diagram illustrating the relation between an output power efficiency $E_1$ and an output current $I_1$ of a power supply. The output current $I_1$ of the LD power supply may be calculated through formula (4) which is shown as follows:

$$P_L/V_{LS} = I_1 \quad (4)$$

The specific value of $P_L$ is calculated through formula (1), and the specific value of $I_1$ is calculated through formula (4). The specific value of the output efficiency $E_1$ corresponding to the specific value of $I_1$ can be obtained according to the relation between the output efficiency $E_1$ and the output current $I_1$ of the LD power supply in FIG. 4. Further, the power loss value X of the LD power supply may be calculated through formula (5):

$$X = P_L/E_1 - P_L \quad (5)$$

Step 304: Calculate the power loss value W of the DFE power supply.

The relation between the output efficiency $E_2$ and the output current $I_2$ of the DFE power supply can also be obtained by referring to FIG. 4. The output power $P_2$ of the DFE power supply is calculated through formula (3), and the output current $I_2$ of the DFE power supply is calculated through formula (6) which is shown as follows:

$$P_2/V_2 = I_2 \quad (6)$$

In the formula above, $V_2$ represents the voltage of the DFE power supply. $I_2$ is calculated through formula (6); the output efficiency $E_2$ corresponding to the output current $I_2$ of the DFE power supply is obtained by referring to FIG. 4; and the power loss value W of the DFE power supply may be calculated through formula (7) which is shown as follows:

$$W = P_2/E_2 - P_2 \quad (7)$$

Step 305: Calculate the total power consumption value $P_T$ of the DSL subscriber board.

The total power consumption value $P_T$ of the DSL subscriber board is calculated through formula (8) which is shown as follows:

$$P_T = P_L + P_2 + X + W + C \quad (8)$$

In the formula above, the output power value of the LD power supply is the power consumption value of the LD unit, and all the output power of the DFE power supply is the power consumption value of the DFE unit. Therefore, the total power consumption value P may be calculated according to the output power and the power loss value X of the LD power supply, the output power $P_2$ and the power loss value W of the DFE power supply, and power consumption values of the CPU power supply and the convergence power supply. The output power of the LD power supply is the power consumption value $P_L$ of the LD unit, and the sum of the power consumption values of the CPU power supply and the convergence power supply is a constant C.

As can be seen, in the embodiment of the present disclosure, the power consumption value of each functional unit on the DSL subscriber board, the power consumption value of each subscriber port on the DSL subscriber board, and the total power consumption value of the DSL subscriber board may be calculated in real time according to the output efficiency of each power supply on the DSL subscriber board and the electrical parameters of each functional unit in different working states.

Step 306: Calculate the power consumption values $P_{DQ}$, $P_{DZ}$ and $P_{DY}$ of each subscriber port in the inactive working state, activating working state and active working state.

The power consumption value $P_{DQ}$ of each subscriber port in the inactive state is calculated through formula (9) which is shown as follows:

$$P_{DQ}=P_{2Q}/Nm+X/Nm+W/Nm+C/Nm+P_{LQ} \quad (9)$$

In the formula above, $P_{LQ}$ is the corresponding power consumption value of the LD unit when the subscriber port is in the inactive working state; $P_{2Q}$ is the corresponding output power of the DFE power supply when all subscriber ports are in the inactive working state; X is the power loss value of the LD power supply; W is the power loss value of the DFE power supply; and Nm is the number of all subscriber ports on the DSL subscriber board.

The power consumption value $P_{DZ}$ of each subscriber port in the activating working state is calculated through formula (10) which is shown as follows:

$$P_{DZ}=P_{2Q}/Nm+X/Nm+W/Nm+C/Nm+P_{LQ}+P_{2Z} \quad (10)$$

In the formula above, $P_{LQ}$ is the corresponding power consumption value of the LD unit when the subscriber port is in the inactive state; $P_{2Q}$ is the corresponding output power of the DFE power supply when all subscriber ports are in the inactive state; X is the power loss value of the LD power supply; W is the power loss value of the DFE power supply; $P_{2Z}$ is the corresponding increment of the output power of the DFE power supply when the subscriber port changes from the inactive state to the activating state; $P_{2Y}$ is the corresponding increment of the output power of the DFE power supply when the subscriber port changes from the inactive state to the active state; Nm is the number of subscriber ports on the DSL subscriber board; and C is the sum of power consumption values of the DFE unit and the CPU unit.

From formula (9) and formula (10), formula (11) of $P_{DZ}$ may be obtained as follows:

$$P_{DZ}=P_{DQ}+P_{2Z} \quad (11)$$

The power consumption value $P_{DY}$ of each subscriber port in the active working state is calculated through formula (12) which is shown as follows:

$$P_{DY}=P_{2Q}/Nm+X/Nm+W/Nm+C/Nm+P_{2Y}+P_{LY} \quad (12)$$

In the formula above, $P_{LY}$ is the corresponding power consumption value of the LD subunit when the subscriber port is in the active state; $P_{2Q}$ is the corresponding output power of the DFE power supply when all subscriber ports are in the inactive state; X is the power loss value of the LD power supply; W is the power loss value of the DFE power supply; $P_{2Z}$ is the corresponding increment of the output power of the DFE power supply when the subscriber port changes from the inactive state to the activating state; and Nm is the number of all subscriber ports on the DSL subscriber board.

In the embodiment of the present disclosure, the output power of each LD subunit may be reported by an existing functional unit on the subscriber board, for example, by a DFE unit. The power consumption value of the functional unit on the subscriber board may also be obtained through other calculation methods or lookup of a table; the required parameters are preset constants, inherent parameters of hardware, or parameters available from the functional unit on the DSL subscriber board.

In the embodiment of the present disclosure, the working state of the subscriber port on the DSL subscriber board and the number of subscriber ports in each different working state are monitored in real time, and the preset electrical parameters and the output power of each LD subunit reported by the functional unit of the DSL subscriber board, for example, the DFE unit, are used, so as to calculate the power consumption value of each functional unit, the power consumption value of each subscriber port on the DSL subscriber board, and the total power consumption value of the DSL subscriber board. In this way, the power consumption value of each functional unit of the DSL subscriber board when the subscriber port is in different working states, the total power consumption value of the DSL subscriber board, and the power consumption value of each subscriber port on the DSL subscriber board are monitored and calculated in real time, so that the operator can take focused energy-saving measures according to the power consumption value of the DSL subscriber board to realize high-efficiency energy utilization, so as to reduce energy consumption and protect environment.

Figure 5:
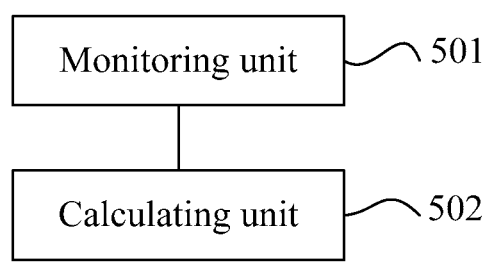
FIG. 5 is a schematic structural diagram of a first specific embodiment of an apparatus for monitoring a power consumption value of a DSL subscriber board in the embodiments of the present disclosure.

FIG. 5 is a schematic structural diagram of a first specific embodiment of an apparatus for monitoring a power consumption value of a DSL subscriber board in the embodiments of the present disclosure. As shown in FIG. 5, the apparatus for monitoring a power consumption value of a DSL subscriber board in the embodiment of the present disclosure includes a monitoring unit 501 and a calculating unit 502. The monitoring unit 501 is configured to monitor working states of subscriber ports on the DSL subscriber board, the number of subscriber ports in each working state, and an output power of each LD subunit on the DSL subscriber board. The calculating unit 502 is configured to calculate the power consumption value of the DSL subscriber board in real time according to results of the monitoring of the monitoring unit 501 and preset electrical parameters of each functional unit when the subscriber port is in different working states.

The preset electrical parameters of each functional unit include: power consumption values of the convergence unit and the CPU unit, a static bias current of the LD unit, a change amount of the output power of the LD power supply and the DFE power supply when one subscriber port changes from the inactive state to the activating state or active state, and a mapping relation between the output current and the power consumption efficiency of the power supply. The preset electrical parameters may be obtained from product specifications or measured beforehand, and it is not necessary to connect an external measurement device in real time, change the circuit design of the DSL subscriber board, or add a dedicated measurement unit. Further, the DFE unit may report the output power of each LD subunit on the DSL subscriber board.

In the embodiment of the present disclosure, the monitoring unit monitors the working state of the subscriber port on the DSL subscriber board, and then the preset electrical parameters of each functional unit when the subscriber port on the subscriber board is in different working states, the monitored electrical parameters or the working state of the subscriber port, and the number of subscriber ports in each different working state are used, so as to monitor the power consumption value of each functional unit on the DSL subscriber board, the power consumption value of each subscriber port on the DSL subscriber board, and the total power consumption value of the DSL subscriber board in real time. The embodiment of the present disclosure involves no modification to the structure or circuit design of the DSL subscriber board and no connection to an external device such as an ammeter and a voltmeter, and is easily practicable, and therefore, the operator can take energy-saving measures to realize high-efficiency energy utilization on the DSL subscriber board and reduce energy consumption of the DSL subscriber board, so as to protect environment and reduce operating cost.

Figure 6:
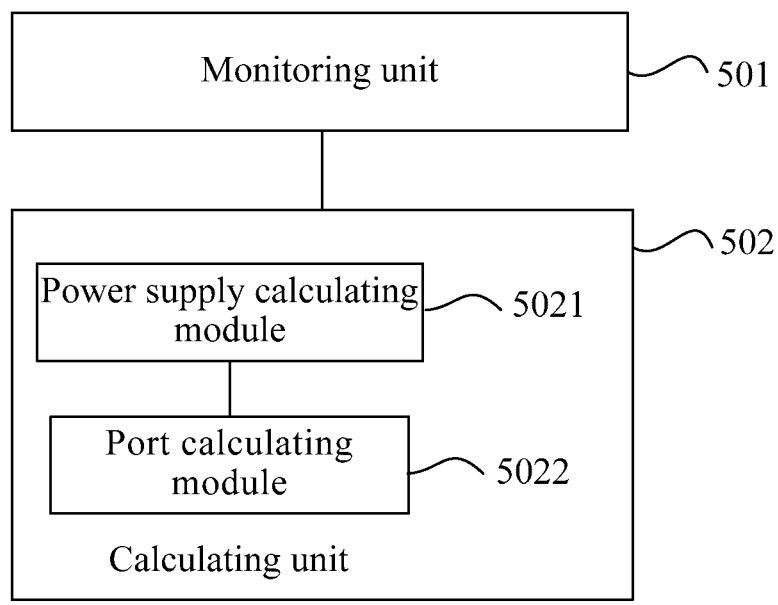
FIG. 6 is a schematic structural diagram of a second specific embodiment of an apparatus for monitoring a power consumption value of a DSL subscriber board in the embodiments of the present disclosure.

FIG. 6 is a schematic structural diagram of a second specific embodiment of an apparatus for monitoring a power consumption value of a DSL subscriber board in the embodiments of the present disclosure. As shown in FIG. 6, the calculating unit in the apparatus for monitoring a power consumption value of a DSL subscriber board in the embodiment of the present disclosure may include a power supply calculating module 5021 and a port calculating module 5022. The power supply calculating module 5021 is configured to calculate the output power and the power loss values of the LD power supply and the DFE power supply; and calculate the power consumption values of the LD unit and the DFE unit according to the preset electrical parameters, the working states of the subscriber ports, and the number of subscriber ports in each different working state, whereupon the calculating unit calculates the total power consumption value of the DSL subscriber board according to the calculation result of the power supply calculating module. The port calculating module is configured to calculate the power consumption value of each subscriber port on the DSL subscriber board.

Figure 7:
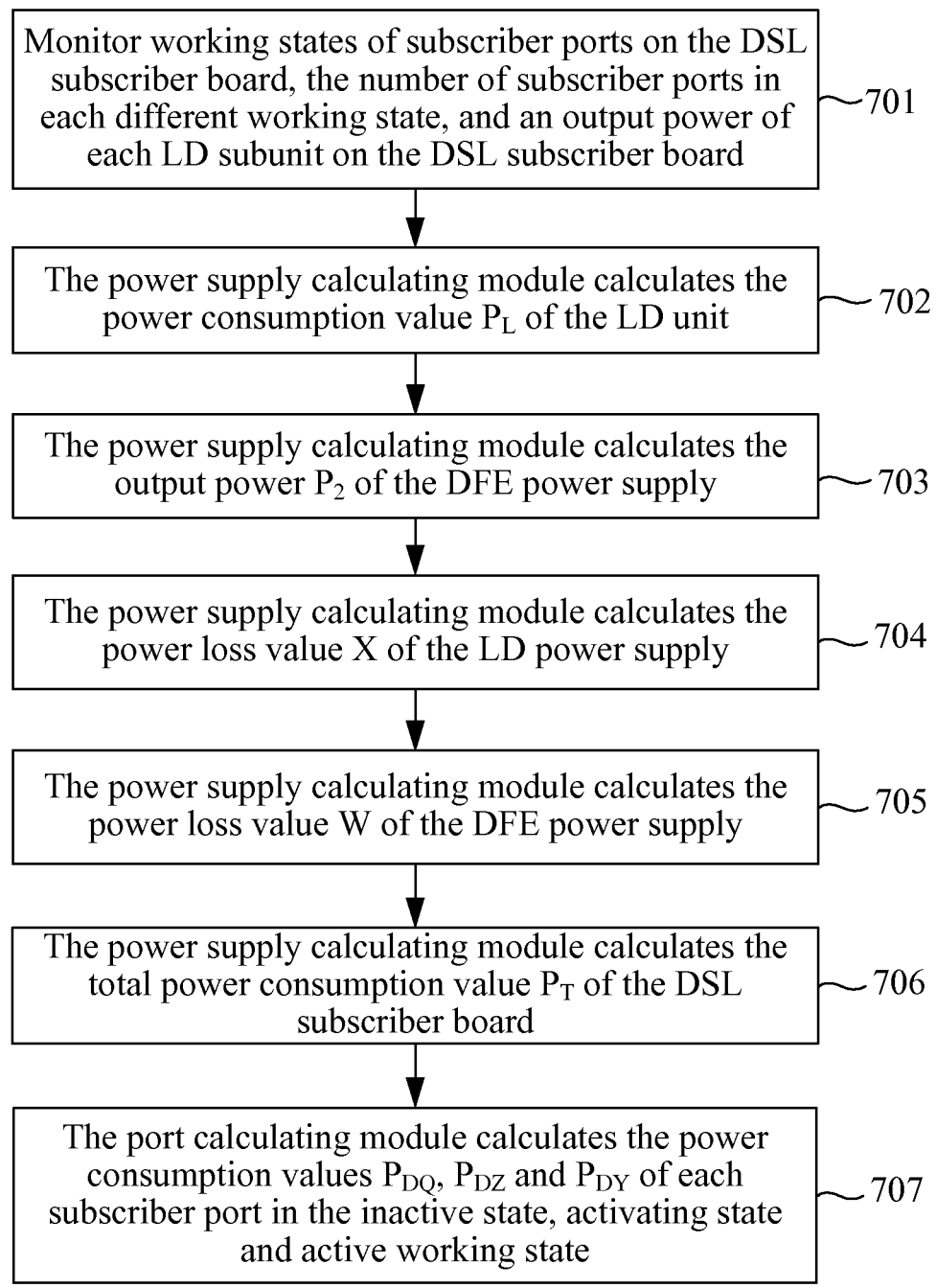
FIG. 7 is a flowchart of the second specific embodiment of the apparatus for monitoring a power consumption value of a DSL subscriber board in the embodiments of the present disclosure.

FIG. 7 is a flowchart the second specific embodiment of the apparatus for monitoring a power consumption value of a DSL subscriber board in the embodiments of the present disclosure. As shown in FIG. 7, the specific calculation steps of the apparatus for monitoring a power consumption value of a DSL subscriber board in the embodiment of the present disclosure are as follows.

Step 701: Monitor working states of a subscriber ports on the DSL subscriber board, the number of subscriber ports in each different working state, and an output power of each LD subunit on the DSL subscriber board.

The monitoring unit 501 monitors the working states of the subscriber ports on the subscriber board. The state that the subscriber port on the DSL subscriber board is not responsive or connected to any user equipment is defined as the inactive working state; the state that the subscriber port on the DSL subscriber board is responsive but not connected to any user equipment is defined as the activating working state; and the state that the subscriber port on the DSL subscriber board is responsive and connected to the user equipment is defined as the active state. Further, the monitoring unit 501 needs to monitor the number of the subscriber ports which are in the inactive, activating, and active states respectively. The monitoring unit 501 notifies the results of monitoring to the calculating unit 502, and therefore, the calculating unit 502 calculates the power consumption value of each functional unit on the DSL subscriber board, the total power consumption value of the DSL subscriber board, and the power consumption value of each subscriber port on the DSL subscriber board.

The power consumption values of the convergence power supply and the CPU power supply which supply power to the convergence unit and the CPU unit are constants C, which are preset electrical parameters. The power consumption value of the LD unit is the output power of the LD power supply.

Further, the DFE unit may report the output power of each LD subunit in real time while the DSL subscriber board is used.

Step 702: The power supply calculating module calculates the power consumption value $P_L$ of the LD unit.

The power supply calculating module 5021 may calculate the power consumption value $P_L$ of the LD unit through formula (1):

$$P_L = N_{LQ} * P_{LQ} + N_{LZ} * P_{LZ} + \sum_{n=0}^{Nm} P_{LYn} \qquad (1)$$

In formula (1), $P_{LQ}$ is the corresponding power consumption value of the LD unit when a subscriber port is in the inactive state; $N_{LQ}$ is the number of subscriber ports in the inactive state; $P_{LZ}$ is the corresponding power consumption value of the LD unit when a subscriber port is in the activating state; $N_{LZ}$ is the number of subscriber ports in the activating state; and $P_{LYn}$ represents the corresponding power consumption value of the LD subunit when the nth subscriber port is in the active state.

The corresponding power consumption value $P_{LQ}$ of the LD unit when the subscriber port is in the inactive state and the power consumption value $P_{LZ}$ of the LD unit when the subscriber port is in the activating state are constants, and can be obtained from specifications of the LD unit directly. The LD power supply calculating module 5021 calculates the power consumption value $P_{LYn}$ of the nth subscriber port in the active state through the calculation formula (2) which is shown as follows:

$$P_{LYn} = (\sqrt{10^{P_{LOn}/10}/10} * N * 0.8 + I_q) * V_{LS} + P_C \qquad (2)$$

In formula (2), $P_{LOn}$ is the output power of the LD subunit corresponding to the nth subscriber port which is in the active state; Iq is the static bias current of the LD unit; $V_{LS}$ is the voltage provided by the LD power supply to the LD unit; and N is a preset transformation ratio of a transformer between the subscriber port and the LD unit. $P_{LOn}$ is provided by the DFE unit; and Iq, $V_{LS}$ and N are constants, and can be obtained from specifications of the DSL subscriber board.

$P_C$ is used to perform calibration for the theoretical $P_L$ value and measured $P_L$ value; and $P_{LOn}$ ranges from −20 dBm to 20.5 dBm.

Step 703: The power supply calculating module 5021 calculates the output power $P_2$ of the DFE power supply.

The power supply calculating module 5021 calculates the output power $P_2$ of the DFE power supply through the calculation formula (3) which is shown as follows:

$$P_2 = (P_{2Q} + N_{2Z} * P_{2Z} + N_{2Y} * P_{2Y}) \qquad (3)$$

In the formula above, $P_{2Q}$ is the corresponding output power of the DFE power supply when all subscriber ports are in the inactive state; $P_{2Z}$ is the corresponding increment of the output power of the DFE power supply when a subscriber port changes from the inactive state to the activating state; $P_{2Y}$ is the corresponding increment of the output power of the DFE power supply when a subscriber port changes from the activating state to the active state; $N_{2Z}$ is the number of subscriber ports which change from the inactive state to the activating state; and $N_{2Y}$ is the number of subscriber ports which change from the activating working state to the active working state.

Step 704: The power supply calculating module 5021 calculates the power loss value X of the LD power supply.

According to the calculation results of formula (1) and formula (2), the power supply calculating module 5021 may calculate the output current $I_1$ of the LD power supply through formula (4) which is shown as follows:

$$P_L/V_{LS}=I_1 \quad (4)$$

The value of $E_1$ corresponding to the value of $I_1$ can be looked up in FIG. 4 according to Table 1 and the specific value of $I_1$ calculated through formula (4). Further, the power supply calculating module 5021 may calculate the power loss value X of the LD power supply through formula (5):

$$X=P_L/E_1-P_L \quad (5)$$

Step 705: The power supply calculating module 5021 calculates the power loss value W of the DFE power supply.

The relation between the output efficiency $E_2$ and the output current $I_2$ of the DFE power supply can also be obtained by referring to FIG. 4. The output power $P_2$ of the DFE power supply is calculated through formula (3), and the output current $I_2$ of the DFE power supply is calculated through formula (6) which is shown as follows:

$$P_2/V_2=I_2 \quad (6)$$

In the formula above, $V_2$ represents the voltage of the DFE power supply. $I_2$ is calculated through formula (6); the output efficiency $E_2$ corresponding to the output current $I_2$ of the DFE power supply is obtained by referring to FIG. 4; and the power loss value W of the DFE power supply may be calculated through formula (7) which is shown as follows:

$$W=P_2/E_2-P_2 \quad (7)$$

Step 706: The power supply calculating module 5021 calculates the total power consumption value $P_T$ of the DSL subscriber board.

The power supply calculating module 5021 calculates the total power consumption value $P_T$ of the DSL subscriber board through formula (8) which is shown as follows:

$$P_T=P_L+P_2+X+W+C \quad (8)$$

In the formula above, the output power value of the LD power supply is the power consumption value of the LD unit, all the output power of the DFE power supply is the power consumption value of the DFE unit, and the total power consumption value $P_T$ is calculated according to the output power and the power loss value X of the LD power supply, the output power $P_2$ and the power loss value W of the DFE power supply, and the power consumption values of the CPU power supply and the convergence power supply. The output power of the LD power supply is the power consumption value $P_L$ of the LD unit, and the sum of the power consumption values of the CPU power supply and the convergence power supply is a constant C.

Step 707: The port calculating module 5022 calculates the power consumption values $P_{DQ}$, $P_{DZ}$ and $P_{DY}$ of each subscriber port in the inactive working state, activating working state and active working state.

The port calculating module 5022 calculates the power consumption value $P_{DQ}$ of each subscriber port in the inactive state. The port calculating module 5022 calculates the power consumption value $P_{DQ}$ of each subscriber port in the inactive state through formula (9) which is shown as follows:

$$P_{DQ}=P_{2Q}/Nm+X/Nm+W/Nm+C/Nm+P_{LQ} \quad (9)$$

In the formula above, $P_{LQ}$ is the corresponding power consumption value of the LD unit when the subscriber port is in the inactive working state; $P_{2Q}$ is the corresponding output power of the DFE power supply when all subscriber ports are in the inactive state; X is the power loss value of the LD power supply; W is the power loss value of the DFE power supply; and Nm is the number of all subscriber ports on the DSL subscriber board.

The port calculating module 5022 calculates the power consumption value $P_{DZ}$ of each subscriber port in the activating working state through formula (10) which is shown as follows:

$$P_{DZ}=P_{2Q}/Nm+X/Nm+W/Nm+C/Nm+P_{LQ}+P_{2Z} \quad (10)$$

In the formula above, $P_{2Q}$ is the corresponding output power of the DFE power supply when all subscriber ports are in the inactive state; X is the power loss value of the LD power supply; W is the power loss value of the DFE power supply; $P_{2Z}$ is the corresponding increment of the output power of the DFE power supply when the subscriber port changes from the inactive state to the activating state; $P_{LQ}$ is the corresponding power consumption value of the LD unit when the subscriber port is in the inactive state; $P_{2Y}$ is the corresponding increment of the output power of the DFE power supply when the subscriber port changes from the inactive state to the active state; Nm is the number of subscriber ports on the DSL subscriber board; and C is the sum of power consumption values of the DFE unit and the CPU unit.

From formula (9) and formula (10), formula (11) of $P_{DZ}$ may be obtained as follows:

$$P_{DZ}=P_{DQ}+P_{2Z} \quad (11)$$

The port calculating module 5022 calculates the power consumption value $P_{DY}$ of one subscriber port in the active working state through formula (12) which is shown as follows:

$$P_{DY}=P_{2Q}/Nm+X/Nm+W/Nm+C/Nm+P_{2Y}+P_{LY} \quad (12)$$

In the formula above, $P_{LY}$ is the corresponding power consumption value of the LD subunit when the subscriber port is in the active working state; $P_{2Q}$ is the corresponding output power of the DFE power supply when all subscriber ports are in the inactive state; X is the power loss value of the LD power supply; W is the power loss value of the DFE power supply; $P_{2Z}$ is the corresponding increment of the output power of the DFE power supply when the subscriber port changes from the inactive state to the activating state; and Nm is the number of all subscriber ports on the DSL subscriber board.

In the embodiment of the present disclosure, the working state of each subscriber port on the DSL subscriber board is monitored in real time, and the electrical parameters, for example, voltage, current, output power, and output efficiency, which are obtained beforehand according to the structure and inherent characteristics of the DSL subscriber board are used, so as to monitor the power consumption value of each functional unit when the DSL subscriber board is used, the power consumption value of each subscriber port on the DSL subscriber board, and the total power consumption value of the DSL subscriber board in real time. It is not necessary to modify the structure of the functional units or circuit design on the DSL subscriber board or connect an external measurement device such as an ammeter and a voltmeter for measuring the electrical parameters such as current and voltage, and the operator can monitor the power consumption value in the DSL subscriber board in real time, and can take energy-saving measures to realize high-efficiency energy utilization on the DSL subscriber board and reduce energy consumption, so as to protect environment.

Figure 8:
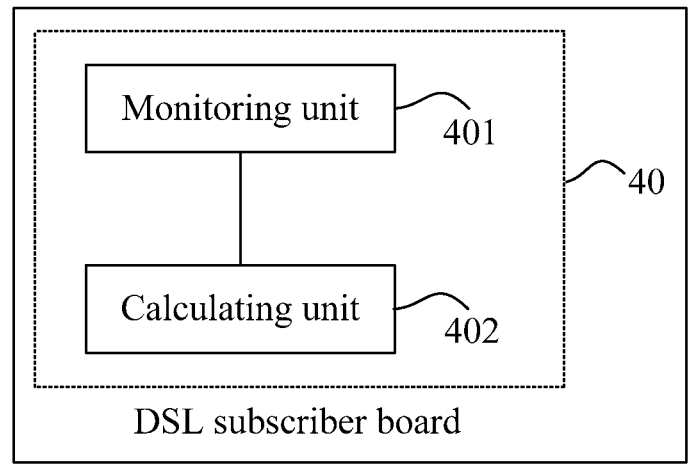
FIG. 8 is a first schematic structural diagram of a specific embodiment of a DSL subscriber board in the embodiments of the present disclosure.

FIG. 8 is a first schematic structural diagram of a specific embodiment of a DSL subscriber board in the embodiments of the present disclosure. As shown in FIG. 8, the DSL subscriber board in the embodiment of the present disclosure includes an apparatus 40 for monitoring a power consumption value of a DSL subscriber board, and the apparatus 40 for monitoring a power consumption value of a DSL subscriber board includes a monitoring unit 501 and a calculating unit 502. The monitoring unit 501 is configured to monitor the working states of the subscriber ports on the DSL subscriber board. The calculating unit 502 is configured to monitor the power consumption value of each functional unit on the DSL subscriber board, the total power consumption value of the DSL subscriber board, and the power consumption value of each subscriber port on the DSL subscriber board in real time according to parameters such as the working states of the subscriber ports that are monitored by the monitoring unit 501 and the number of subscriber ports in each different working state, and electrical parameters of each functional unit when the subscriber port is in different working states.

The parameters collected by the monitoring unit 501 may be provided by the functional units on the DSL subscriber board; the electrical parameters may be obtained through hardware design or from specifications of components. For example, the output power of the LD subunit corresponding to the subscriber port in the active state may be reported by the DFE unit; the electrical parameters such as the power supply voltage and the static bias current of the LD unit may be obtained through lookup in the specifications of the LD unit directly. No external monitoring apparatus needs to be connected to monitor the electrical parameters of the functional units.

Figure 9:
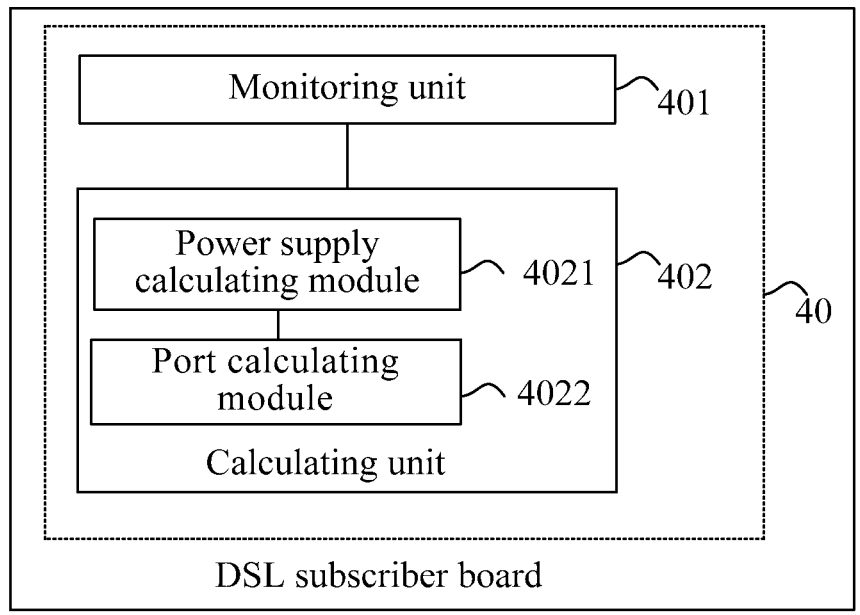
FIG. 9 is a second schematic structural diagram of a specific embodiment of a DSL subscriber board in the embodiments of the present disclosure.

FIG. 9 is a second schematic structural diagram of a specific embodiment of a DSL subscriber board in the embodiments of the present disclosure. As shown in FIG. 9, the DSL subscriber board in the embodiment of the present disclosure includes an apparatus 40 for monitoring a power consumption value of a DSL subscriber board. On the basis of the first specific embodiment of the DSL subscriber board, the calculating unit 502 further includes an LD power supply calculating module 5021 and a DFE power supply calculating module 5022. The LD power supply calculating module 5021 is configured to calculate the power consumption value of the LD unit corresponding to the subscriber port in the active working state according to the power supply voltage and static bias current of the LD unit corresponding to the subscriber port in the active working state, transformer ratio, power output to the subscriber port in the active working state, and the number of subscriber ports in the active working state. The DFE power supply calculating module 5022 is configured to calculate the power loss value of the DFE power supply according to the output power and the output efficiency of the DFE power supply.

In the embodiment of the present disclosure, without modifying the structure of the functional units or circuit design on the DSL subscriber board or manually connecting any external measurement device such as an ammeter and a voltmeter for measuring electrical parameters such as current and voltage, the power consumption value of each functional unit on the DSL subscriber board in different working states, the power consumption value of each subscriber port on the DSL subscriber board, and the total power consumption value of the DSL subscriber board can be monitored in real time. Therefore, the operator can take energy-saving measures to realize high-efficiency energy utilization on the DSL subscriber board and reduce energy consumption, so as to protect environment.

Persons of ordinary skill in the art should understand that part of the steps of the method according to the embodiments may be implemented by a program instructing relevant hardware. The program may be stored in a computer readable storage medium. When the program runs, the steps of the method according to the embodiments are performed. The storage medium may be any medium capable of storing program codes, such as ROM, RAM, magnetic disk, or optical disk.

Finally, it should be noted that the above embodiments are merely provided for describing the technical solutions of the present disclosure, but not intended to limit the present disclosure. It should be understood by persons of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the scope of the technical solutions according to the embodiments of the present disclosure.

What is claimed is:

1. A method for monitoring a power consumption value of a digital subscriber line (DSL) subscriber board in real time, comprising:

monitoring, by a monitoring unit, a working state of each subscriber port on the DSL subscriber board, the number of the subscriber ports in each different working state, and an output power of each line driver (LD) subunit in an LD unit on the DSL subscriber board, wherein the different working state of each subscriber port is one of the group consisting of: an inactive state, an activating state and an active state; and calculating, by a calculating unit, the power consumption value of the DSL subscriber board in real time according to a monitoring result and preset electrical parameters of each functional unit when a subscriber port is in a different working state;

wherein the calculating the power consumption value comprises:

calculating a power consumption value $P_L$ of the LD unit, wherein $P_L$ is calculated through the following formula:

$$P_L = N_{LQ} * P_{LQ} + N_{LZ} * P_{LZ} + \sum_{n=0}^{Nm} P_{LYn}$$

where $N_{LQ}$ is the number of subscriber ports in the inactive state, $P_{LQ}$ is a corresponding preset power consumption value of an LD subunit when a subscriber port is in the inactive state; $N_{LZ}$ is the number of subscriber ports in the activating state, $P_{LZ}$ is a corresponding preset power consumption value of the LD subunit when a subscriber port is in the activating state, Nm is the number of all subscriber ports on the DSL subscriber board, and $P_{LYn}$ is a power consumption value of the LD subunit corresponding to an nth subscriber port that is in the active state.

2. The method according to claim 1, wherein the calculating the power consumption value of the DSL subscriber board in real time comprises:

calculating output power and power loss values of an LD power supply that supplies power to the LD unit and a digital front end (DFE) power supply that supplies power to a DFE unit, a total power consumption value of the DSL subscriber board, and a power consumption value of each subscriber port on the DSL subscriber board in real time.

3. The method according to claim 2, wherein $P_{LYn}$ is calculated through the following formula:

$$P_{LYn}=(\sqrt{10^{P_{LOn}/10}*N*0.8+I_q})*V_{LS}+P_C$$

where $P_{LOn}$ is the output power of the LD subunit corresponding to the nth subscriber port that is in the active working state; N is a preset transformation ratio of a transformer between the subscriber port and the LD unit, Iq is a preset static bias current of the LD unit, $V_{LS}$ is a preset voltage provided by the LD power supply to the LD unit, and $P_C$ is a preset difference between a theoretical calculated value and a measured power consumption value of the LD subunit.

4. The method according to claim 3, wherein the calculating the power consumption value of the DSL subscriber board in real time according to the result of the monitoring and the preset electrical parameters of each functional unit comprises:
calculating a power loss value X of the LD power supply, wherein X is calculated through the following formula:

$$X=P_L/E_1-P_L$$

where $E_1$ is a preset output efficiency corresponding to an output current $I_1$ of the LD power supply.

5. The method according to claim 4, wherein the calculating the power consumption value of the DSL subscriber board in real time according to the result of the monitoring and the preset electrical parameters of each functional unit comprises:
calculating an output power $P_2$ of the DFE power supply that supplies power to the DFE unit,
wherein $P_2$ is calculated through the following formula:

$$P_2=(P_{2Q}+N_{2Z}*P_{2Z}+N_{2Y}*P_{2Y})$$

where $P_{2Q}$ is a corresponding preset output power of the DFE power supply when all subscriber ports on the DSL subscriber board are in the inactive working state; $P_{2Z}$ is a corresponding increment of the output power of the DFE power supply when a subscriber port changes from the inactive working state to the activating working state; $P_{2Y}$ is a corresponding increment of the output power of the DFE power supply when a subscriber port changes from the activating working state to the active working state; $N_{2Z}$ is the number of subscriber ports that change from the inactive working state to the activating working state; and $N_{2Y}$ is the number of subscriber ports that change from the activating working state to the active working state.

6. The method according to claim 5, wherein the calculating the power consumption value of the DSL subscriber board in real time according to the result of the monitoring and the preset electrical parameters of each functional unit comprises:
calculating a power loss value W of the DFE power supply, wherein W is calculated through the following formula:

$$W=P_2/E_2-P_2$$

where $E_2$ is a preset output efficiency corresponding to an output current $I_2$ of the DFE power supply.

7. The method according to claim 6, wherein the calculating the power consumption value of the DSL subscriber board in real time according to the result of the monitoring and the preset electrical parameters of each functional unit comprises:
calculating a power consumption value $P_{DQ}$ of each subscriber port in the inactive state, a power consumption value $P_{DZ}$ of each subscriber port in the activating state, and a power consumption value $P_{DY}$ of each subscriber port in the active state, wherein $P_{DQ}$, $P_{DZ}$ and $P_{DY}$ are respectively calculated through the following formulae:

$$P_{DQ}=P_{2Q}/Nm+X/Nm+W/Nm+C/Nm+P_{LQ}$$

$$P_{DZ}=P_{2Q}/Nm+X/Nm+W/Nm+C/Nm+P_{LQ}+P_{2Z}$$

where $P_{LYn}$ is the power consumption value of the LD subunit corresponding to the nth subscriber port that is in the active working state; $P_{2Q}$ is the corresponding output power of the DFE power supply when all subscriber ports on the DSL subscriber board are in the inactive working state; X is the power loss value of the LD power supply; W is the power loss value of the DFE power supply; $P_{2Z}$ is the corresponding increment of the output power of the DFE power supply when the subscriber port changes from the inactive state to the activating state; $P_{2Y}$ is the corresponding increment of the output power of the DFE power supply when the subscriber port changes from the inactive state to the active state; Nm is the number of subscriber ports on the DSL subscriber board; and C is a sum of power consumption values of the DFE unit and a CPU unit.

8. An apparatus for monitoring a power consumption value of a Digital Subscriber Line (DSL) subscriber board, comprising:
a monitoring unit, configured to monitor a working state of each subscriber port on the DSL subscriber board, the number of subscriber ports in each different working state, and an output power of each Line Driver (LD) subunit in an LD unit on the DSL subscriber board, wherein the different working state of each subscriber sort is one of the group consisting of: an inactive state, an activating state and an active state; and
a calculating unit, configured to calculate the power consumption value of the DSL subscriber board in real time according to a monitoring result and preset electrical parameters of each functional unit when a subscriber port is in a different working state;
wherein the calculating the power consumption value comprises:
calculating a power consumption value $P_L$ of the LD unit wherein $P_L$ is calculated through the following formula:

$$P_L = N_{LQ}*P_{LQ}+N_{LZ}*P_{LZ}+\sum_{n=0}^{Nm}P_{LYn}$$

where $N_{LQ}$ is the number of subscriber sorts in the inactive state, $P_{LQ}$ is a corresponding preset power consumption value of an LD subunit when a subscriber port is in the inactive state; $N_{LZ}$ is the number of subscriber ports in the activating state, $P_{LZ}$ is a corresponding preset power consumption value of the LD subunit when a subscriber port is in the activating state, Nm is the number of all subscriber ports on the DSL subscriber board, and $P_{LYn}$ is a power consumption value of the LD subunit corresponding to an nth subscriber port that is in the active state.

9. The apparatus according to claim 8, wherein the calculating unit comprises a power supply calculating module and a port calculating module;
the power supply calculating module is configured to calculate output power and power loss values of an LD power supply and a Digital Front End (DFE) power supply; and the port calculating module is configured to calculate a total power consumption value of the DSL subscriber board and is further configured to calculate a power consumption value of each subscriber port on the DSL subscriber board.

10. The apparatus according to claim 8, wherein $P_{LYn}$ is calculated by the power supply calculating module through the following formula:

$$P_{LYn}=(\sqrt{10^{P_{Lon}/10}}/10*N*0.8+I_q)*V_{LS}+P_C$$

where $P_{Lon}$ is the output power of the LD subunit corresponding to the nth subscriber port that is in the active working state; N is a preset transformation ratio of a transformer between the subscriber port and the LD unit, Iq is a preset static bias current of the LD unit, $V_{LS}$ is a preset voltage provided by the LD power supply to the LD unit, and $P_C$ is a preset difference between a theoretical calculated value and a measured power consumption value of the LD subunit.

11. The apparatus according to claim 8, wherein the power supply calculating module further calculates a power loss value X of the LD power supply through the following formula:

$$X=P_L/E_1-P_L$$

where $E_1$ is a preset output efficiency corresponding to an output current $I_1$ of the LD power supply.

12. The apparatus according to claim 11, wherein the power supply calculating module further calculates an output power $P_2$ of the DFE power supply that supplies power to a DFE unit through the following formula:

$$P_2=(P_{2Q}+N_{2Z}*P_{2Z}+N_{2Y}*P_{2Y})$$

where $P_{2Q}$ is a corresponding preset output power of the DFE power supply when all subscriber ports on the DSL subscriber board are in the inactive working state; $P_{2Z}$ is a corresponding increment of the output power of the DFE power supply when a subscriber port changes from the inactive working state to the activating working state; $P_{2Y}$ is a corresponding increment of the output power of the DFE power supply when a subscriber port changes from the activating working state to the active working state; $N_{2Z}$ is the number of subscriber ports that change from the inactive state to the activating state; and $N_{2Y}$ is the number of subscriber ports that change from the activating state to the active working state.

13. The apparatus according to claim 12, wherein the power supply calculating module further calculates a power loss value W of the DFE power supply through the following formula:

$$W=P_2/E_2-P_2$$

where $E_2$ is a preset output efficiency corresponding to an output current $I_2$ of the DFE power supply.

14. The apparatus according to claim 13, wherein the port calculating module calculates a power consumption value $P_{DQ}$ of each subscriber port in the inactive state, a power consumption value $P_{DZ}$ of each subscriber port in the activating state, and a power consumption value $P_{DY}$ of each subscriber port in the active state through the following formulae respectively:

$$P_{DQ}=P_{2Q}/Nm+X/Nm+W/Nm+C/Nm+P_{LQ}$$

$$P_{DZ}=P_{2Q}/Nm+X/Nm+W/Nm+C/Nm+P_{LQ}+P_{2Z}$$

$$P_{DY}=P_{2Q}/Nm+X/Nm+W/Nm+C/Nm+P_{2Y}+P_{LYn}$$

where $P_{LYn}$ is the power consumption value of the LD subunit corresponding to the nth subscriber port that is in the active working state; $P_{2Q}$ is the corresponding output power of the DFE power supply when all subscriber ports on the DSL subscriber board are in the inactive working state; X is the power loss value of the LD power supply; W is the power loss value of the DFE power supply; $P_{2Z}$ is the corresponding increment of the output power of the DFE power supply when the subscriber port changes from the inactive state to the activating state; $P_{2Y}$ is the corresponding increment of the output power of the DFE power supply when the subscriber port changes from the inactive state to the active state; Nm is the number of subscriber ports on the DSL subscriber board; and C is a sum of power consumption values of the DFE unit and a CPU unit.

15. An apparatus, comprising:
a processor configured for implementing a method comprising:
monitoring a working state of each subscriber port on a Digital Subscriber Line (DSL) subscriber board, the number of subscriber ports in each different working state, and an output power of each Line Drive (LD) subunit in an LD unit on the DSL subscriber board, wherein the different working state of each subscriber port is one of the group consisting of: an inactive state, an activating state and an active state; and
calculating a power consumption value of the DSL subscriber board in real time according to a monitoring result and preset electrical parameters of each functional unit;
wherein the calculating the power consumption value comprises:
calculating a power consumption value $P_L$ of the LD unit wherein $P_L$ is calculated through the following formula:

$$P_L = N_{LQ}*P_{LQ} + N_{LZ}*P_{LZ} + \sum_{n=0}^{Nm} P_{LYn}$$

where $N_{LQ}$ is the number of subscriber sorts in the inactive state, $P_{LQ}$ is a corresponding preset power consumption value of an LD subunit when a subscriber port is in the inactive state; $N_{LZ}$ is the number of subscriber ports in the activating state, $P_{LZ}$ is a corresponding preset power consumption value of the LD subunit when a subscriber port is in the activating state, Nm is the number of all subscriber ports on the DSL subscriber board, and $P_{LYn}$ is a power consumption value of the LD subunit corresponding to an nth subscriber port that is in the active state.

16. The apparatus according to claim 15, wherein the calculating the power consumption value of the DSL subscriber board in real time comprises:
calculating output power and power loss values of an LD power supply that supplies power to the LD unit and a Digital Front End (DFE) power supply that supplies power to a digital front end DFE unit, a total power consumption value of the DSL subscriber board, and a power consumption value of each subscriber port on the DSL subscriber board in real time.

17. The apparatus according to claim 15, wherein $P_{LYn}$ is calculated through the following formula:

$$P_{LYn}=(\sqrt{10^{P_{Lon}/10}}/10*N*0.8+I_q)*V_{LS}+P_C$$

where $P_{Lon}$ is the output power of the LD subunit corresponding to the nth subscriber port that is in the active working state; N is a preset transformation ratio of a transformer between the subscriber port and the LD unit, Iq is a preset static bias current of the LD unit, $V_{LS}$ is a preset voltage provided by the LD power supply to the LD unit, and $P_C$ is a preset difference between a theoretical calculated value and a measured power consumption value of the LD subunit.

* * * * *

UNITED STATES PATENT AND TRADEMARK OFFICE
CERTIFICATE OF CORRECTION

PATENT NO. : 8,953,748 B2  
APPLICATION NO. : 13/463389  
DATED : February 10, 2015  
INVENTOR(S) : Chen et al.

Page 1 of 1

It is certified that error appears in the above-identified patent and that said Letters Patent is hereby corrected as shown below:

Claims

Column 16, line 33, Claim 8, "sort is one" should read -- port is one --.

Column 16, line 50, Claim 8, "sorts in" should read -- ports in --.

Column 18, line 43, Claim 16, "sorts in" should read -- ports in --.

Signed and Sealed this
Seventeenth Day of November, 2015

Michelle K. Lee
*Director of the United States Patent and Trademark Office*